Dec. 24, 1940.     J. LE GORRE     2,225,701

MEANS FOR CONNECTING BRANCH AND MAIN PIPES

Filed Oct. 6, 1938

WITNESS:
Robt P Mitchel

INVENTOR
Jean Le Gorre
BY
Augustus B. Stoughton
ATTORNEY.

Patented Dec. 24, 1940

2,225,701

UNITED STATES PATENT OFFICE 2,225,701

MEANS FOR CONNECTING BRANCH AND MAIN PIPES

Jean Le Gorre, Philadelphia, Pa.

Application October 6, 1938, Serial No. 233,629

2 Claims. (Cl. 251—155)

The present invention relates to improvements in means for connecting a branch pipe to a main pipe in domestic water and other supply systems; and, more particularly, to a form of fitting including the usual T-fitting and the stop valve and waste outlet.

The principal object of the present invention is to simplify and cheapen the construction and to reduce the costs of application of the means employed for connecting a main and a branch pipe while retaining the stop valve and waste outlet.

Other objects of the invention will appear from the following description at the end of which the invention will be claimed.

Generally stated, the invention comprises a unitary or one-piece T-pipe fitting having an internal partition defining a through fluidway and a branch fluidway and provided with a port, a valve co-operating with the port, and a waste connection or outlet on the branch pipe side of the partition.

The invention also comprises the improvements to be presently described and finally claimed.

In the following description, reference will be made to the accompanying drawing forming part hereof and in which.

Figure 1:
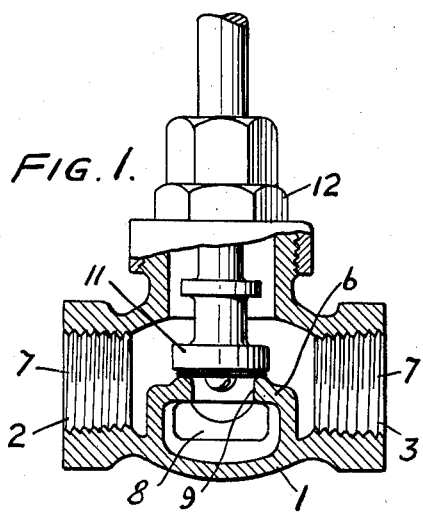
Fig. 1 is a view, partly in section, of a fitting embodying features of the invention.
Figure 2:
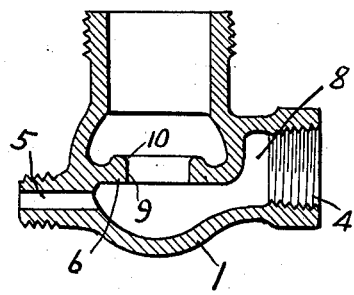
Fig. 2 is a sectional view taken at right angles to Fig. 1, with the valve and its stem and bonnet omitted.

Referring to the drawing, and more particularly to Figs. 1 and 2, I generally indicates a T-fitting which, of course, is hollow and consists, in effect, of one-piece, such as a casting, or at any rate is a unitary structure. This fitting is provided with four outlets 2, 3, 4 and 5, in respect to the interior of the fitting, although in part, they operate as inlets in respect to the flow of fluid through the fitting. 6 indicates an internal partition defining a through fluidway 7 between the outlets 2 and 3 and a branch fluidway 8 to the outlet 4. This partition is provided with a port 9 and with a valve seat 10. 11 is a stop valve co-operating with seat 10, and its stem extends through the bonnet 12 and is provided with a hand-piece not shown because it is too well understood to require illustration.

In use, the described fitting is interposed in a main pipe which is connected with it at 2 and 3. The branch pipe is connected with it at 4, and the waste pipe is connected with it at 5. The valve 11 operates as a stop valve for the branch pipe and, whether the valve be opened or closed, the through fluidway for the main pipe is open. It may be remarked that the fitting is extremely simple in construction and it will be evident to those skilled in the art that it can be inexpensively applied or installed for the reason that the branch pipe can be connected directly to the outlet 4; whereas, in present installations with which I am familiar, the branch pipe outlet is connected to one end of a nipple and the stop valve is connected to the other end of the nipple and the stop valve is connected to the branch pipe, making three connections in all between the T-fitting and the branch pipe; whereas, in the construction of this invention, there is but one connection between the branch pipe and the T-fitting which embodies as a part of it the stop valve and the drain outlet.

Figure 3:
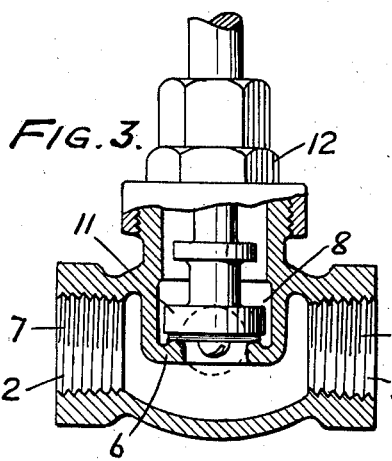
Figs. 3 and 4 are, respectively, similar views illustrating a modification of the invention.
Figure 4:
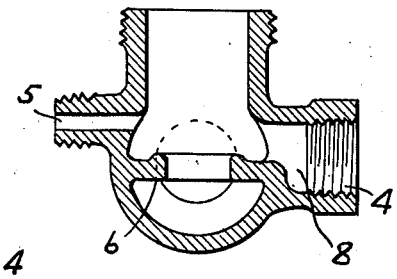

The construction and mode of operation of the modification shown in Figs. 3 and 4 are as above described except that the valve 11 is not located in the through waterway as in Figs. 1 and 2 but is located on the branch side of the partition 6.

Figure 5:
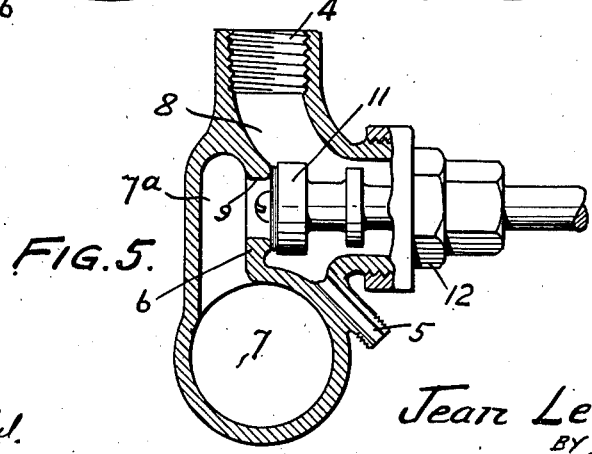
Fig. 5 is a transverse sectional view illustrating another modification.

The construction and mode of operation of the modification illustrated in Fig. 5 are as above described except that the partition 6 is disposed at right angles to the through waterway, instead of parallel with it. Thus there is provided a slight enlargement 7ª of the through fluidway.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. For connecting the end of a branch pipe to the adjacent spaced ends of a main pipe, a T-fitting having a single wall and four openings of which three receive the pipe ends and having a single internal partition defining with the single wall a constantly open straight through fluidway and a branch fluidway and provided with a port, said fluidways lying in substantially a single plane, a valve co-operating with the port to control the branch fluidway only and having its stem perpendicular to said plane, and an independent waste connection at the fourth opening and on the branch pipe side of the partition.

2. Means for connecting a branch pipe to a main pipe substantially as described in claim 1 and in which the T-fitting including the through fluidway is a unitary or one-piece structure.

JEAN LE GORRE.